US012619573B2

(12) United States Patent
Raj et al.

(10) Patent No.: US 12,619,573 B2
(45) Date of Patent: May 5, 2026

(54) SYSTEMS AND METHODS FOR OPERATING A SERIAL PERIPHERAL INTERFACE (SPI) NETWORK

(71) Applicant: Microchip Technology Incorporated, Chandler, AZ (US)

(72) Inventors: Naveen Raj, Chandler, AZ (US); Christian Pillonel, Cheyres (CH); Cristian Androne, Bucharest (RO); Yann Johner, Preverenges (CH)

(73) Assignee: Microchip Technology Incorporated, Chandler, AZ (US)

( * ) Notice: Subject to any disclaimer, the term of this patent is extended or adjusted under 35 U.S.C. 154(b) by 49 days.

(21) Appl. No.: 18/915,445

(22) Filed: Oct. 15, 2024

(65) Prior Publication Data

US 2026/0044472 A1      Feb. 12, 2026

Related U.S. Application Data

(60) Provisional application No. 63/682,293, filed on Aug. 12, 2024.

(51) Int. Cl.
*G06F 13/40*        (2006.01)
*G06F 13/42*        (2006.01)
(52) U.S. Cl.
CPC .. *G06F 13/4282* (2013.01); *G06F 2213/0002* (2013.01)
(58) Field of Classification Search
None
See application file for complete search history.

(56) References Cited

U.S. PATENT DOCUMENTS

| | | | |
|---|---|---|---|
| 2004/0064608 A1* | 4/2004 | Mclachlan .......... | G06F 13/4256 |
| | | | 710/62 |
| 2019/0188174 A1* | 6/2019 | Raja ..................... | G06F 13/405 |
| 2020/0286571 A1* | 9/2020 | McCracken ......... | G11C 7/1093 |
| 2020/0327090 A1* | 10/2020 | Voss ..................... | G01R 33/09 |
| 2021/0303503 A1 | 9/2021 | Remple et al. | |

(Continued)

OTHER PUBLICATIONS

VTI Technologies, "Technical Note 15: SPI Interface Specification," 5 pages, Sep. 19, 2005.

(Continued)

*Primary Examiner* — Hyun Nam
(74) *Attorney, Agent, or Firm* — SLAYDEN GRUBERT BEARD PLLC

(57)        ABSTRACT

A system includes a master device and multiple slave devices connected in a daisy chain arrangement, and configured to communicate according to a serial peripheral device interface (SPI) protocol. The master device includes circuitry to clock a series of bits into respective shift registers of the multiple slave devices, including (a) first data clocked into first shift registers of a first slave device and (b) an ignore command clocked into second shift registers of a second slave device, and use a clock signal to communicate an execute instruction to the plurality of slave devices. The execute instruction causes the first slave device to write the first data from the first shift registers to a first memory of the first slave device, whereas the execute instruction causes the second slave device to execute the ignore command to preclude a data write at a second memory of the second slave device.

20 Claims, 5 Drawing Sheets

(56) References Cited

U.S. PATENT DOCUMENTS

| | | | | |
|---|---|---|---|---|
| 2022/0327089 | A1* | 10/2022 | Hyakudai ........... | G06F 13/4282 |
| 2023/0185758 | A1* | 6/2023 | Wang .................. | G06F 13/4291 |
| | | | | 710/110 |
| 2023/0195672 | A1* | 6/2023 | Wen .......................... | G06F 1/10 |
| | | | | 710/314 |
| 2023/0195681 | A1* | 6/2023 | Bernardinis ........ | G06F 13/4291 |
| | | | | 710/105 |
| 2023/0267086 | A1* | 8/2023 | Lai ...................... | G06F 13/4282 |
| | | | | 710/110 |
| 2024/0232125 | A1* | 7/2024 | Wu ..................... | G06F 13/4282 |
| 2024/0394213 | A1* | 11/2024 | Yang ...................... | H05B 45/30 |

OTHER PUBLICATIONS

Maxim Integrated, "Application Note 3947: Daisy-Chaining SPI Devices," 8 pages, Dec. 15, 2006.
Partial International Search Report and Invitation to Pay Additional Fees, Application No. PCT/US2025/015481, 11 pages, Jun. 17, 2025.

* cited by examiner

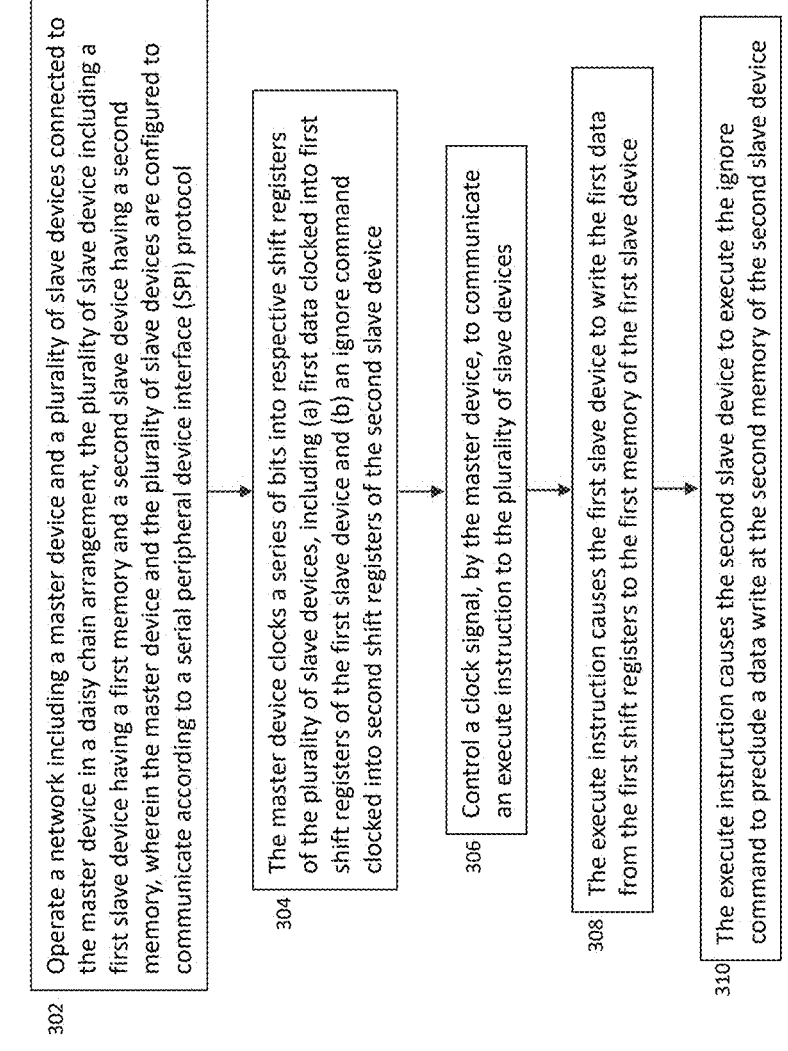

300

302 Operate a network including a master device and a plurality of slave devices connected to the master device in a daisy chain arrangement, the plurality of slave device including a first slave device having a first memory and a second slave device having a second memory, wherein the master device and the plurality of slave devices are configured to communicate according to a serial peripheral device interface (SPI) protocol 304 The master device clocks a series of bits into respective shift registers of the plurality of slave devices, including (a) first data clocked into first shift registers of the first slave device and (b) an ignore command clocked into second shift registers of the second slave device 306 Control a clock signal, by the master device, to communicate an execute instruction to the plurality of slave devices 308 The execute instruction causes the first slave device to write the first data from the first shift registers to the first memory of the first slave device 310 The execute instruction causes the second slave device to execute the ignore command to preclude a data write at the second memory of the second slave device

FIG. 3

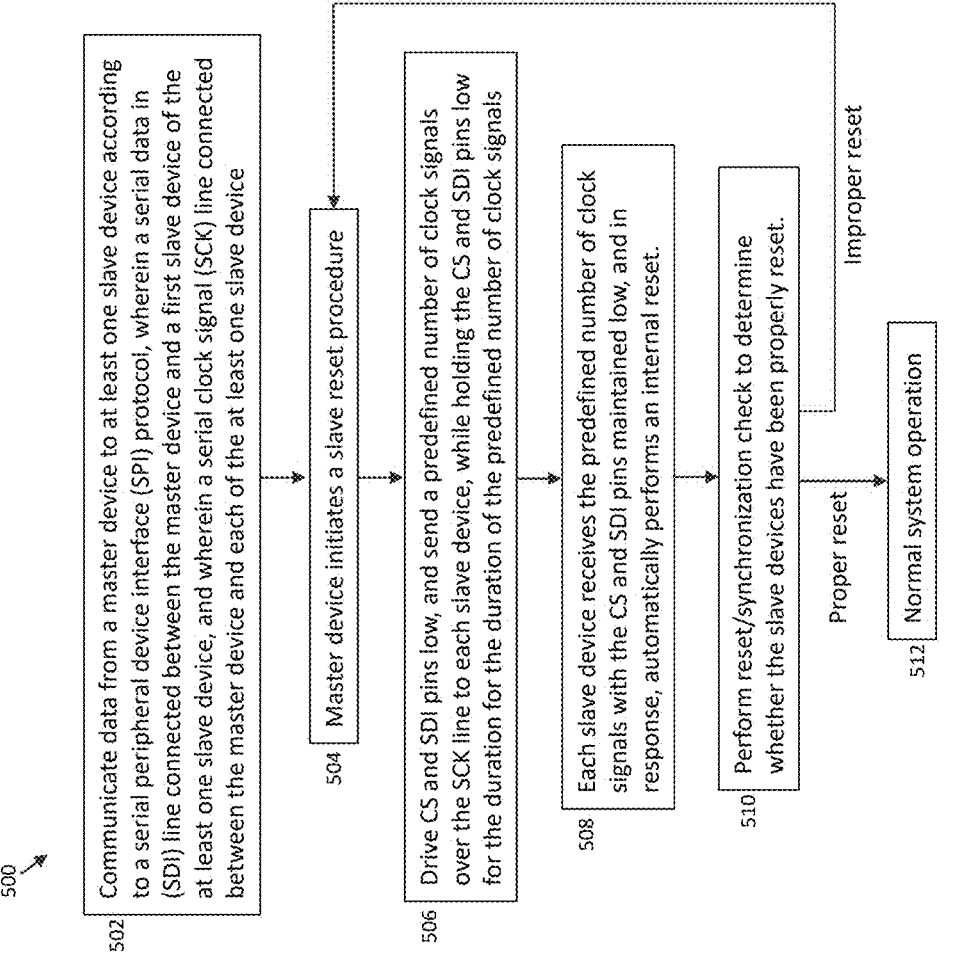

502 Communicate data from a master device to at least one slave device according to a serial peripheral device interface (SPI) protocol, wherein a serial data in (SDI) line connected between the master device and a first slave device of the at least one slave device, and wherein a serial clock signal (SCK) line connected between the master device and each of the at least one slave device 504 Master device initiates a slave reset procedure 506 Drive CS and SDI pins low, and send a predefined number of clock signals over the SCK line to each slave device, while holding the CS and SDI pins low for the duration for the duration of the predefined number of clock signals 508 Each slave device receives the predefined number of clock signals with the CS and SDI pins maintained low, and in response, automatically performs an internal reset.

510 Perform reset/synchronization check to determine whether the slave devices have been properly reset.

Improper reset

Proper reset

512 Normal system operation

SYSTEMS AND METHODS FOR OPERATING A SERIAL PERIPHERAL INTERFACE (SPI) NETWORK

RELATED APPLICATION

This application claims priority to commonly owned U.S. Provisional Ser. No. 63/682,293 filed Aug. 12, 2024, the entire contents of which are hereby incorporated by reference for all purposes.

TECHNICAL FIELD

The present disclosure relates to systems and methods for operating a Serial Peripheral Interface (SPI) network, for example including performing target write operations and slave device reset procedures.

BACKGROUND

Serial Peripheral Interface (SPI) is a synchronous serial communication protocol typically used for short-distance and high-speed synchronous data transfer between embedded systems. SPI is a three or four-wire bus and SPI devices communicate in full-duplex mode with a dedicated channel for transmitting data and a separate channel for receiving data. SPI typically contains the following wires, including (a) Serial Data Out (SDO), or Master Out Slave Input (MOSI), for host/master to target/slave communication, (b) Serial Data In (SDI), or Master Input Slave Output (MISO), target/slave to host/master communication, (c) Serial Clock (SCK), and (d) Chip Select/Serial Select (CS/SS) to select which target(s)/slave(s) to communicate with.

SPI utilizes separate clock and data lines to ensure synchronicity between both the host and client. The oscillating clock signal tells the receiver when to read bits on the data line. Because both data and clock signals are synchronized, there is no need to specify clock speed. SPI generally offers faster throughput speeds compared to asynchronous serial protocols and can support multiple target/client devices (with multiple Serial Selects) so that one host device can read various sensor data.

A multi-slave SPI system may be arranged in (a) an independent slave configuration, wherein the slaves are connected in parallel, and wherein a separate chip select line is connected between the master and each respective slave, or (b) a cooperative slave, or daisy chain configuration, wherein the slaves are connected in series, wherein a shared chip select line is connected between the master and all slaves, and wherein the output of each slave (except the last slave in series) is transferred to the next slave in series, and the output of the last slave in series is transferred back to the master.

In a conventional daisy chain SPI system, the master reads data from each slave and then writes data to each respective slave, wherein the data written to each slave is either a copy of the data read from that slave, or new data to replace the data read from that slave. Accordingly, all slaves must be updated (i.e., requiring a read of each respective device) in order to write to any slave or slaves in the chain. This may be undesirable, as writing to a single target slave (or subset of slaves) requires superfluous reads and writes for all other slaves. There is a need for improved addressing of a single slave or subset of slaves in a daisy chain SPI system, for example without needing to update all slaves when writing to a selected slave or subset of slaves.

In addition, in a conventional SPI protocol (e.g., having each an independent slave or daisy chain configuration), when the system becomes stuck/locked-up, the device must be power cycled to reset the system. Such power cycle is often impractical or impossible, for example where a battery cannot be easily removed and replaced. Alternatively, a chip select (CS) signal may be used to reset the slave devices. However, in some SPI systems, the CS is used for another purpose and is not available for a system reset function. For example an SPI system having a daisy-chain configuration may use the CS for data transfer, rendering the CS unavailable for a system reset. As another example, some SPI systems (e.g. including non-daisy chain systems) may not include a CS line, for example to save a microcontroller pin for another use. There is need for improved systems and methods to recover a locked-up SPI system, for example without requiring a power cycle and/or without using a CS signal for system reset.

SUMMARY

The present disclosure provides systems and methods for addressing specific slave(s) in an SPI daisy chain configuration, e.g., without disturbing the other slaves in the chain. For example, such systems and methods may allow a master device to write to a target slave or slaves, without writing to other non-targeted slaves, and thus without needing to read all devices before performing the targeted write. Avoiding such reads may provide significant time savings, especially in a system including many slaves in the chain.

In some examples, a system (device network) includes a master device (master) and multiple slave devices (slaves) connected to the master in a daisy chain arrangement, wherein the master and slaves are configured to communicate with each other according to SPI protocol. The master may include circuitry (e.g., executable instructions) to (a) send a series of data to the slaves, the series of data including (a) slave update data for one or more of the slaves and (b) an ignore command for each other slave, and (b) control a clock signal (CS) to communicate a write command to the plurality of slave devices, for example by raising the CS once the series of data are respectively shifted into registers of the intended slaves. For each slave having respective slave update data shifted therein (i.e., each slave having respective update data to be written thereto), the write command (e.g., CS rising edge) triggers the respective slave to write the respective slave update data. However, for each slave having an ignore command shifted therein (i.e., each slave not needing to be updated), the ignore command causes the respective slave to ignore the write command (e.g., CS rising edge), such that no data write is performed at such slaves.

In one example, the ignore command may be a No Operation Mode (NOP) command, for example using an unused address and unused command in each respective slave. A slave that receives such NOP command will ignore a write command from the master (e.g., triggered by the CS pin going high) such that the slave is not updated by the write command.

In addition, some examples provide systems and methods for resetting SPI slave devices (in a daisy chain or non-daisy chain arrangement), for example without requiring a power cycle and without needing a CS signal for the reset. In some examples, the master device may perform a reset procedure by sending a predefined number of clock signals (e.g., 4096 clocks) to slaves over the serial clock signal (SCK) line, while the CS and serial data in (SDI) pins are held low for the duration of the predefined clock signals. Each slave device count the number of received clocks for which the SDI is held low, and automatically performs an internal reset upon reaching the predefined number of clock signals. In some examples, at least one slave may send a reset confirmation signal to the master indicating the slave has performed a reset, and the master may check the timing of the received reset confirmation signal to determine whether the respective slave has been properly reset.

One aspect provides a system including a master device and a plurality of slave devices connected to the master device in a daisy chain arrangement, the plurality of slave device including a first slave device having a first memory and a second slave device having a second memory. The master device and the plurality of slave devices are configured to communicate according to a serial peripheral device interface (SPI) protocol. The master device includes circuitry to clock a series of bits into respective shift registers of the plurality of slave devices, including (a) first data clocked into first shift registers of the first slave device and (b) an ignore command clocked into second shift registers of the second slave device, and use a clock signal to communicate an execute instruction to the plurality of slave devices. The execute instruction causes the first slave device to write the first data from the first shift registers to the first memory of the first slave device, whereas the execute instruction causes the second slave device to execute the ignore command to preclude a data write at the second memory of the second slave device.

In some examples, the ignore command causes the second slave device to enter a no operation mode (NOP) in response to the execute instruction.

In some examples, the ignore command comprises a reserved address for the second slave device that is executable by the second device as a no operation mode (NOP) command.

In some examples, using a clock signal to communicate an execute instruction to the plurality of slave devices comprises raising a clock signal (CS) high.

One aspect provides a method, comprising operating a network including a master device and a plurality of slave devices connected to the master device in a daisy chain arrangement, the plurality of slave device including a first slave device having a first memory and a second slave device having a second memory, wherein the master device and the plurality of slave devices are configured to communicate according to a serial peripheral device interface (SPI) protocol. The method includes clocking, by the master device, a series of bits into respective shift registers of the plurality of slave devices, including (a) first data clocked into first shift registers of the first slave device and (b) an ignore command clocked into second shift registers of the second slave device, and controlling a clock signal, by the master device, to communicate an execute instruction to the plurality of slave devices. The execute instruction causes the first slave device to write the first data from the first shift registers to the first memory of the first slave device, whereas the execute instruction causes the second slave device to execute the ignore command to preclude a data write at the second memory of the second slave device.

In some examples, the ignore command causes the second slave device to enter a no operation mode (NOP) in response to the execute instruction.

In some examples, the ignore command comprises a reserved address for the second slave device that is executable by the second device as a no operation mode (NOP) command.

One aspect provides a system including a master device configured to communicate data with at least one slave device according to a serial peripheral device interface (SPI) protocol, a serial data in (SDI) line connected between the master device and a first slave device of the at least one slave device, and a serial clock signal (SCK) line connected between the master device and each of the at least one slave device. The master device includes circuitry to initiate a slave reset procedure including sending a predefined number of clock signals over the SCK line to each of the at least one slave device, and maintaining the SDI line at a predefined level for the duration of the predefined number of clock signals, wherein receipt of the predefined number of clock signals with the SDI line maintained at the predefined level causes each respective slave device to automatically perform an internal reset.

In some examples, the at least one slave device comprises a plurality of slave devices connected to the master device in a daisy chain arrangement, the SCK line is connected between the master device and each of the plurality of slave devices, the master device includes circuitry to send the predefined number of clock signals over the SCK line to each of the plurality of slave devices, and each of the plurality of slave devices includes circuitry to automatically perform an internal reset of the respective slave device in response to receiving the predefined number of clock signals with the SDI line maintained at the predefined level.

In some examples, the system includes a chip select (CS) line connected between the master device and the first slave device, wherein the master device includes circuitry to maintain the CS line at a predefined level for the duration of the predefined number of clock signals.

In some examples, the master device includes circuitry to receive a reset confirmation signal from via a serial data out (SDO) line connected between the last slave device and the master device, compare a timing of the receipt of the reset confirmation signal with an expected timing of receipt of the reset confirmation signal, and determine a system status based on the comparison In some examples, the expected timing of receipt of the reset confirmation signal corresponds with the predefined number of clock signals.

In some examples, the master device includes circuitry to: in response to determining the timing of the receipt of the reset confirmation signal matches the expected timing of receipt of the reset confirmation signal, initiate a restart of normal operation of the system, and alternatively, in response to determining the timing of the receipt of the reset confirmation signal does not match the expected timing of receipt of the reset confirmation signal, re-initiate the slave reset procedure.

In some examples, the at least one slave device are connected to the master device in parallel configuration or other non-daisy chain configuration.

One aspect provides a method, including communicating data from a master device to at least one slave device according to a serial peripheral device interface (SPI) protocol, wherein a serial data in (SDI) line connected between the master device and a first slave device of the at least one slave device, and wherein a serial clock signal (SCK) line connected between the master device and each of the at least one slave device. The method includes initiating a slave reset procedure by the master device including sending a predefined number of clock signals over the SCK line to each of the at least one slave device, and maintaining the SDI line at a predefined level for the duration of the predefined number of clock signals, wherein receipt of the predefined number of clock signals with the SDI line maintained at the predefined level causes each respective slave device to automatically perform an internal reset.

In some examples, the at least one slave device comprises a plurality of slave devices connected to the master device in a daisy chain arrangement.

In some examples, the method includes the master device maintaining a chip select (CS) line, connected between the master device and the first slave device, at a predefined level for the duration of the predefined number of clock signals.

In some examples, the method includes receiving, by the master device, a reset confirmation signal from via a serial data out (SDO) line connected between the last slave device and the master device, comparing, by the master device, a timing of the receipt of the reset confirmation signal with an expected timing of receipt of the reset confirmation signal, and determining, by the master device, a system status based on the comparison.

In some examples, the method includes in response to determining the timing of the receipt of the reset confirmation signal matches the expected timing of receipt of the reset confirmation signal, initiating a restart of normal system operation by the master device, and alternatively, in response to determining the timing of the receipt of the reset confirmation signal does not match the expected timing of receipt of the reset confirmation signal, re-initiating the slave reset procedure by the master device.

In some examples, the at least one slave device are connected to the master device in parallel configuration or other non-daisy chain configuration.

BRIEF DESCRIPTION OF THE DRAWINGS

Example aspects of the present disclosure are described below in conjunction with the figures, in which:

FIGS. 2A and 2B collectively illustrate an example of a targeted write operation, wherein FIG. 2A shows an example SPI network including three slave devices, and FIG. 2B shows a timing diagram illustrating a targeted write to the third slave device;

FIG. 3 is a flowchart illustrating an example method of performing a targeted write operation;

FIG. 5 is a flowchart illustrating an example method of performing a slave device reset procedure.

It should be understood that the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Figure 1:
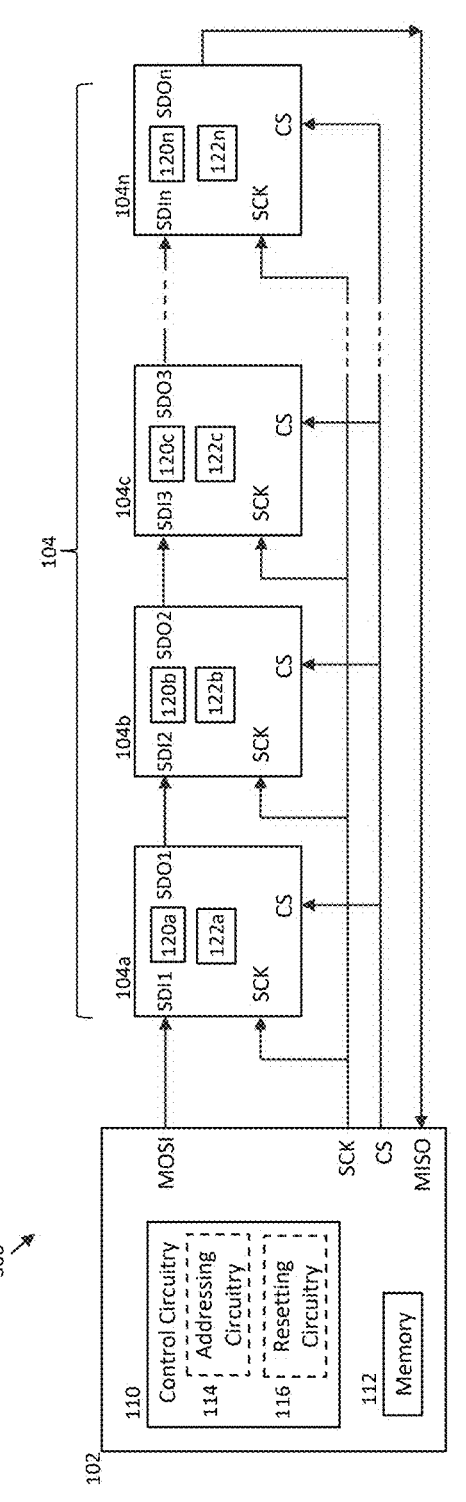
FIG. 1 shows an example system comprising an SPI network including a master device and slave devices connected in a daisy chain arrangement, wherein the master device is configured to perform a targeted write operation at selected slave device(s)

FIG. 1 shows an example system 100 comprising an SPI network including a master device 102 and multiple slave devices 104a . . . 104n (also referred to as slave device 104) connected to the master device 102 in a daisy chain arrangement, wherein the master device 102 is configured to write to selected one(s) of the multiple slave devices 104. It should be understood system 100 may include any number of slave devices 104 connected in the daisy chain arrangement.

The master device 102 may include control circuity 110 and memory 112, and each slave device 104a . . . 104n may include respective shift registers 120a . . . 120n and respective memory devices 122a . . . 120n.

The master device 102 and slave devices 104a, 104b, and 104c are configured to communicate according to a serial peripheral device interface (SPI) protocol. Accordingly, as shown in FIG. 1, a MOSI line of the master device 102 is connected to an SDI line of the first slave device 104a (SDI1), an SDO line of the first slave device 104a (SDO1) is connected to an SDI line of the second slave device 104b (SDI2), an SDO interface of the second slave device 104a (SDO2) is connected to an SDI line of the third slave device 104c (SDI3), and so on along the chain of slave devices 104, wherein an SDO interface of a last slave device 104n (SDOn) is connected to a master in slave out (MOSI) line of the master device 102.

In addition, a serial clock (SCK) line is connected in parallel to slave devices 104a . . . 104n, and a chip select (CS) is also connected in parallel to slave devices 104a . . . 104n.

The control circuity 110 of the master device 102 may include circuitry to perform various operations, including circuitry to read data from respective slave devices 104 and write data to respective slave devices 104. As discussed below, control circuity 110 may include (a) addressing circuitry 114 to write data to a selected subset of the slave devices 104 and/or (b) resetting circuitry 116 to effect a reset of slave devices 104a . . . 104n, e.g., upon detection of a fault or at defined intervals. Control circuity 110, including addressing circuitry 114 and/or resetting circuitry 116, may comprise at least one processor and logic instructions embodied as software and/or firmware stored in one or more memory device and executable by the at least one processor to perform the various functions of addressing circuitry 114 and/or resetting circuitry 116 disclosed herein.

Addressing circuitry 114 may comprise circuitry to write data to a selected subset of the slave devices slave devices 104a . . . 104n, rather than writing data to all slave devices slave devices 104a . . . 104n. The selected subset of slave devices slave devices 104a . . . 104n may be referred to as targeted slave devices 104, and may include one or multiple slave devices 104 but exclude at least one other slave device 104, which may be referred to as non-targeted slave devices 104. For example, addressing circuitry 114 may comprise circuitry to perform a write operation that writes data to slave device 104b (i.e., a targeted slave device 104) without writing data to the other slave devices 104a, 104c . . . 104n (i.e., non-targeted slave devices 104). As another example, addressing circuitry 114 may comprise circuitry to perform a write operation to write respective data to slave devices 104a and 104c (i.e., targeted slave devices 104) without writing data to the other slave devices 104b, 104d . . . 104n (i.e., non-targeted slave devices 104).

As discussed below, in some examples the control circuity 110 may send an ignore command to each non-targeted slave device 104 that causes each non-targeted slave device 104 to ignore an execute instruction that triggers a data write at each targeted slave device 104, such that the ignore command precludes a data write at each non-targeted slave device 104. In some examples, the ignore command may comprise a No Operation Mode (NOP) command, e.g., 00 h, which may comprise a reserved address for the respective non-targeted slave device 104 that is executable by the respective non-targeted slave device 104 as a no operation mode (NOP) command.

Selective writing to target slave device(s) 104 rather than all slave devices 104*a* . . . 104*n* may provide various advantages. For example, the master device 102 may perform a targeted write without needing to read all slave devices before performing the targeted write. Avoiding such reads may provide significant time savings, especially in a system including many slaves devices in the chain.

Figures 2A, 2B:
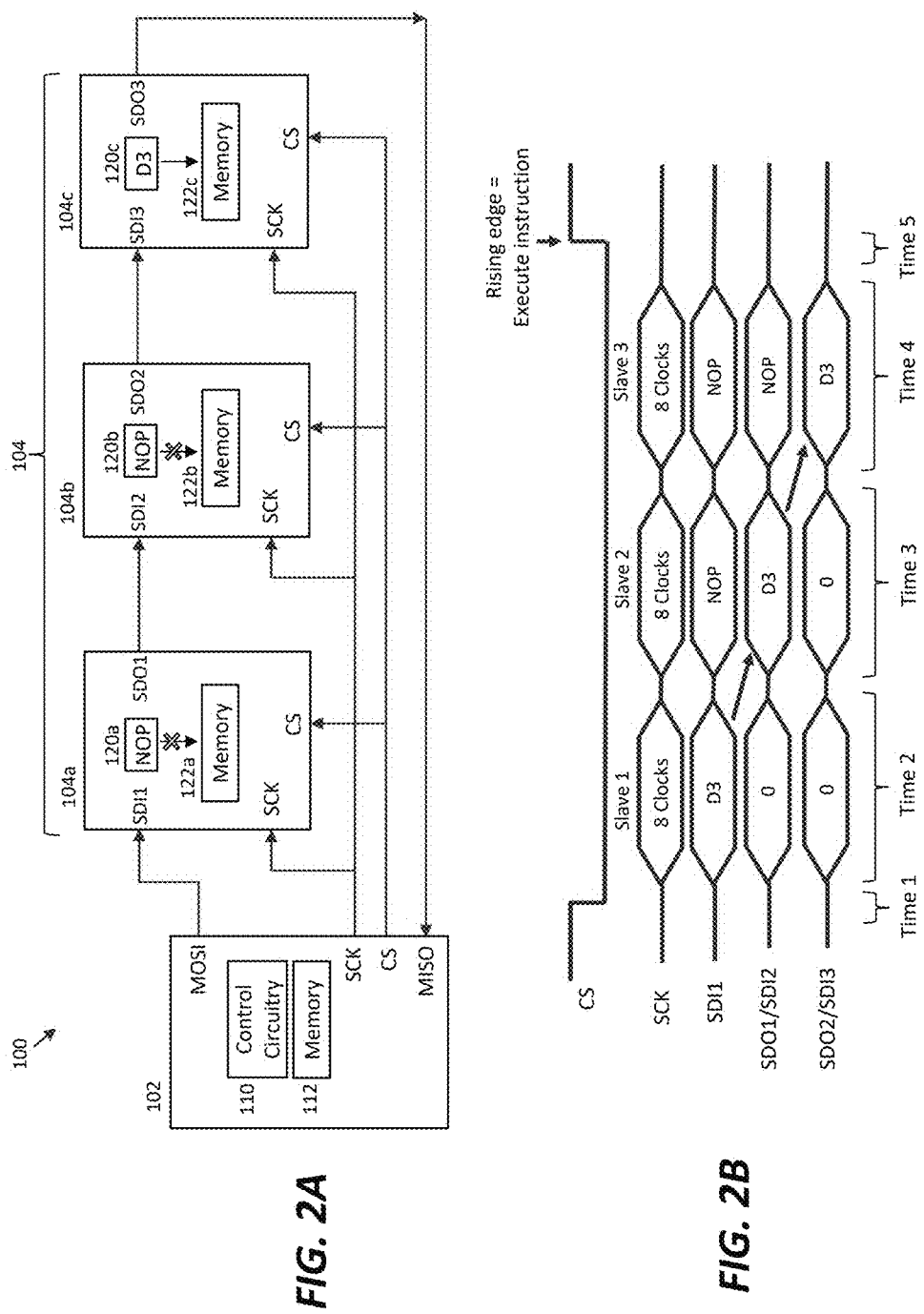

FIGS. 2A and 2B illustrate an example of a targeted write operation using addressing circuitry 114. FIG. 2A shows an example implementation of system 100 that includes three slave devices 104*a*, 104*b*, and 104*c*, and FIG. 2B shows a timing diagram illustrating a targeted write to slave device 104*c*, e.g., as implemented by addressing circuitry 114.

Referring to FIGS. 2A and 2B together, the control circuitry 110 may clock a series of bits into respective shift registers 120*a*, 120*b*, and 120*c* of slave devices 104*a*, 104*b*, and 104*c*. As shown, at a first time (Time 1), addressing circuitry 114 may bring the chip select (CS) pin low to initiate the write operation.

Then, during Time 2, first data D3 (intended for slave device 104*c*) is clocked (shifted) into shift registers 120*a* of slave device 104*a*.

Then, during Time 3, first data D3 is clocked (shifted) from shift registers 120*a* of slave device 104*a* to shift registers 120*b* of slave device 104*b* (via the SDO1 to SDI2 connection shown in FIG. 1A), and an ignore command, e.g., a No Operation Mode (NOP) command, is clocked (shifted) into shift registers 120*a* of slave device 104*a*.

Then, during Time 4, write data D3 is clocked (shifted) from shift registers 120*b* of slave device 104*b* to shift registers 120*c* of slave device 104*c* (via the SDO2 to SDI3 connection); the NOP command is clocked (shifted) from shift registers 120*a* of slave device 104*a* to shift registers 120*b* of slave device 104*b* (via the SDO1 to SDI2 connection); and a further NOP command is clocked (shifted) into shift registers 120*a* of slave device 104*a*.

Thus, at the end of Time 4 (in this example after 24 clocks spanning Time 2 through Time 4) write data D3 resides in shift registers 120*c* of slave device 104*c*, and a NOP command resides in shift registers 120*a* and 120*b* of slave devices 104*a* and 104*b*, respectively, as shown in both FIGS. 2A and 2B.

At this time, indicated at Time 5, control circuitry 110 controls the clock signal CS (in this example by raising CS high) to communicate an execute instruction to the slave devices 104*a*-104*c*. This execute instruction (CS going high) causes each slave device 104 having write data in its respective shift registers 120*a*-120*c* to write the respective write data to the respective memory device 122*a*-122*c* of the respective slave device 104. In this example, only slave device 104*c* has write data (write data D3) shifted into its shift registers 120*c*. Accordingly, in response to the execute instruction (CS going high), slave device 104*c* writes the write data D3 from shift registers 120*c* to memory device 122*c* of the slave device 104*c*. In contrast, in response to the execute instruction (CS going high), each of slave device 104*a* and 104*b* executes the ignore command (NOP command) in the respective shift registers 120*a* and 120*b*, causing slave device 104*a* and 104*b* to perform no operation, thereby precluding a data write at the memory device 122*a* or 122*b* of slave devices 104*a* and 104*b*, respectively.

In this manner, the master device 102 may selectively write to a subset of slave devices 104 (targeted slave device(s) 104), while remaining slave device 104 (non-targeted slave device(s) 104) receive an ignore command (e.g., a NOP command) that precludes a data write at each non-targeted slave device 104. It should be understood that in other instances, the master device 102 may write to all slave devices 104 connected to the master device 102, e.g., to update respective data in all slave devices 104.

FIG. 3 is a flowchart illustrating an example method 300 of selectively writing to a subset of slave devices 104, e.g., using system 100 discussed above. At 302, a system may operate an SPI network including a master device and multiple slave devices connected to the master device in a daisy chain arrangement, including a first slave device having a first memory and a second slave device having a second memory.

At 304, the master device may clock a series of bits into respective shift registers of the multiple slave devices, including (a) first data clocked into first shift registers of the first slave device and (b) an ignore command (e.g., a NOP command) clocked into second shift registers of the second slave device.

At 306, the master device may control a clock signal (CK) to communicate an execute instruction to the multiple slave devices, e.g., by raising the CK bit to a high state.

At 308, the execute instruction causes the first slave device to write the first data from the first shift registers to a first memory of the first slave device. Simultaneously, at 310, the ignore command (e.g., a NOP command) in the second shift registers of the second slave device causes the second slave device to ignore the execute instruction from the master device, thereby precluding a data write at the second slave device.

In this manner, the master device 102 may utilize addressing circuitry 114 to selectively write to the first slave devices, while the second slave device receives an ignore command (e.g., a NOP command) that precludes a data write at the second slave device.

Referring back to FIG. 1, in some examples control circuitry 110 of the master device 102 may also (or alternatively) include resetting circuitry 116 to effect a reset of slave devices 104*a* . . . 104*n*, for example in response to a locked-up slave device 104 or system 100, and in some examples without requiring a power cycle and without needing a CS signal for the reset. Such lock-up may occur, for example, when a respective slave device 104 is missing a clock pulse, such that the respective slave device 104 receives (recognizes) only 7 bits of data instead of 8 bits sent by the master device 102.

In some examples, a reset procedure may involve (a) the master device 102 (e.g., using resetting circuitry 116) sending a predefined number of clock signals (e.g., 4096 clocks) over the serial clock signal (SCK) line to slave devices 104*a* . . . 104*n* while holding at least one predefined pin at a predefined level (low) for the duration of the predefined number of clock signals, (b) respective slave devices 104*a* . . . 104*n* (e.g., using respective circuitry 124*a* . . . 124*n*) determining (counting) the predefined number of clock signals being received with the at least one predefined pin maintained at the predefined level (low) for the duration of the predefined number of clock signals, and (c) in response to such determination by the respective slave devices 104*a* . . . 104*n*, the respective slave devices 104*a* . . . 104*n* automatically resetting themselves.

Thus, according to such reset procedure, the respective slave devices 104*a* . . . 104*n* may automatically reset themselves upon determining both (a) receipt of the predefined number of clock signals and (b) the at least one predefined pin is maintained at the predefined level (low) for the duration of the predefined number of clock signals, and otherwise not reset themselves. For example, the respective slave devices 104a . . . 104n may determine not to initiate a reset if the respective slave device 104 determines (a) fewer than the predefined number of clock signals are received or (b) any of the predefined pin(s) changes state (e.g., from low to high, or high to low) during the receipt of the predefined number of clock signals.

In some examples, the resetting circuitry 116 may perform a reset procedure by sending a predefined number of clock signals (e.g., 4096 clocks) over the serial clock signal (SCK) line to slave devices 104a . . . 104n while both the chip select (CS) pin and serial data in (SDI) pin (i.e., corresponding with the "at least one predefined pin" discussed above) are held low for the duration of the predefined number of clock signals.

According to the standard SDI protocol, when the chip select (CS) pin is driven high, the driver of the SDO pin of each respective slave device 104 in the chain is reset. Thus, the respective SDO pins of slave devices 104a . . . 104n will be driven low upon the next communication frame, in which the CS pin is driven low pursuant to the disclosed reset procedure.

An exception to this rule occurs when a Read command is executed, because execution of Read commands typically assume two different communication frames: a first frame for the read commands/addresses and a second frame for streaming out the read data. Thus, after Read commands/addresses frame (during the data streaming frame), SDO pins of different slave devices 104a . . . 104n may be driven with random read data.

Therefore, to avoid this scenario, in some examples the resetting circuitry 116 toggles the CS pin to low before initiating the reset procedure, which may ensure the respective SDI pins of slave devices 104a . . . 104n in the chain are driven low before and during the predefined clock signals (e.g., 4096 clocks) of the reset procedure.

Each slave device 104a . . . 104n may count the number of received clocks for which the CS and SDI pins are held low, and automatically perform an internal reset upon determining both (a) receipt of the predefined number (e.g., 4096) of clock signals and (b) the CS and SDI pins have been maintained low for the duration of the predefined number of clock signals.

In other words, in the example discussed above, a reset may be automatically triggered by a combination of (a) driving the CS pin low, (b) driving the SDI pin low, and (c) sending a predefined number of clock signals while the CS and SDI pins are held low for the duration of the predefined clock signals. In some instances, the resetting circuitry 116 may start sending the predefined number of clock signals immediately upon driving the CS and SDI pins low, whereas in other instances, the resetting circuitry 116 may start sending the predefined number of clock signals at some time after the CS and SDI pins being driven (and held) low.

In some examples, the resetting circuitry 116 may confirm whether the slave devices 104 have been reset and synchronized. For example, as discussed below with reference to FIG. 4, a slave device 104n may send a reset confirmation signal to the master device 102 via the SDOn line upon reaching the predefined number (e.g., 4096) of clock signals and resetting itself, and the resetting circuitry 116 may determine whether a proper reset has occurred based on the timing of the received reset confirmation signal.

Figure 4:
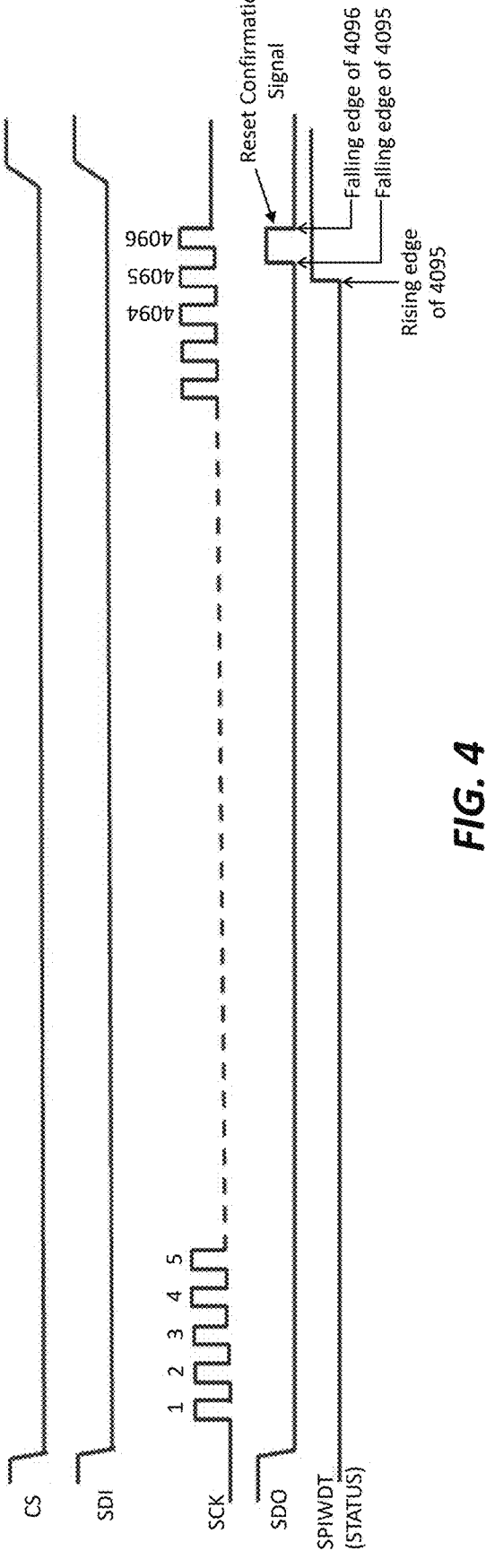
FIG. 4 shows a timing diagram of an example reset procedure for resetting slave devices.

FIG. 4 shows a timing diagram of an example reset procedure implemented by resetting circuitry 116 of the master device 102 shown in FIG. 1. Referring to FIG. 1, the master device 102 may perform the example reset procedure to reset slave devices 104a-104n connected to the master device 102.

As shown in FIG. 4, to initiate the reset procedure, the resetting circuitry 116 may bring the CS pin and SDI1 pins low, and then send a predefined number of clock signals (in this example, 4096 clocks) on the SCK line to slave devices 104a . . . 104n while the CS and SDI1 pins are maintained low. Each slave device 104a . . . 104n may include circuitry to (a) count the number of received clocks during which the SDI remains low, and (b) upon reaching the predefined number of clock signals, e.g., in this example upon reaching cycle 4095, set an SPIWDT internal STATUS flag and automatically initiate an internal device reset. In some examples, the SPIWDT internal STATUS flag will remain set until the occurrence of a predefined event, e.g., a Read, Power on, or Software reset event.

In some examples, the final slave device 104n may include circuitry to send a reset confirmation signal upon reaching the predefined number (e.g., 4096) of clock signals and resetting itself, e.g., by raising the SDOn pin high for one clock signal, as indicated in FIG. 4. The reset confirmation signal is received on the MISO line of the master device 102, and the resetting circuitry 116 may compare a timing of the receipt of the reset confirmation signal with an expected timing of receipt (e.g., at clock time 4096). If the resetting circuitry 116 determines the reset confirmation signal is received via SDOn of the final slave device 104n at the expected time, the resetting circuitry 116 may determine the system 100 is properly reset (e.g., slave device 104a . . . 104n are synchronized) and thus resume normal operations. Alternatively, if the resetting circuitry 116 determines the reset confirmation signal is received before or after the expected time, the resetting circuitry 116 may determine the system 100 is still in a fault or unsynchronized state, and may thus continue to hold the SDI1 pin low and send another series of clock signals (e.g., 4096 clocks) and then check the timing of a further reset confirmation signal received from slave device 104n via the SDOn line.

FIG. 5 is a flowchart illustrating an example method 500 of a slave device reset procedure implemented by a master device. At 502, a system may operate an SPI network including a master device and at least one slave device connected to the master device (e.g., in a daisy chain arrangement or non-daisy chain arrangement). The SPI network may include a serial data in (SDI) line connected between the master device and a first slave device of the at least one slave device, and a serial clock signal (SCK) line connected between the master device and each slave device.

At 504, the master device (e.g., using resetting circuitry 116) initiates a slave reset procedure. In particular, at 506, the master device drives the CS pin low and respective SDI pins of each slave device low, and sends a predefined number of clock signals (e.g., 4096 clocks) over the SCK line to each slave device, while holding the CS and SDI pins low for the duration of the predefined number of clock signals.

At 508, each respective slave device identifies receipt of the predefined number of clock signals, with the CS and SDI pins maintained low for the duration of the predefined number of clock signals, and in response, automatically performs an internal reset.

At 510, the system may perform a reset/synchronization check to determine whether the slave devices have been properly reset. For example, upon counting the predefined number of clock signals (e.g., 4096 clocks) and initiating an internal reset, a respective slave device (e.g., a last slave device in a daisy chain arrangement) may send a reset confirmation signal to the master device via the SDO line of the respective slave device. The reset confirmation signal may comprise, for example, raising the SDO line for a single clock signal. Upon receiving the reset confirmation signal via the SDO line, the master device (e.g., using resetting circuitry 116) may compare a timing of the receipt of the reset confirmation signal with an expected timing of receipt of the reset confirmation signal, determine a system status based on the comparison.

If the master device determines the timing of the receipt of the reset confirmation signal matches the expected timing of receipt of the reset confirmation signal, the master device may initiate a restart of normal system operation by the master device at 512. Alternatively, if the master device determines the timing of the receipt of the reset confirmation signal does not match the expected timing of receipt of the reset confirmation signal (e.g., the reset confirmation signal is received before or after the expected receipt time), the master device may re-initiate the slave reset procedure, for example by sending another series of clock signals (e.g., 4096 clocks) with the CS and SDI pins driven low, and then check the timing of a further reset confirmation signal received from respective slave device.

The disclosed reset procedure may provide various advantages. For example, the disclosed reset procedure may allow a simple implementation, e.g., needing no additional pins. As another example, the reset clock definition, i.e., the predefined number of clock signals (e.g., 4096 in the examples discussed above) can be dynamically set based on the number of daisy chained slave devices 104a . . . 104n. As another example, the disclosed reset procedure can be used in non-daisy chain arrangements, for example if the user wants to ground the CS pin to save an I/O pin of the microcontroller or other relevant device.

Although example embodiments have been described above, other variations and embodiments may be made from this disclosure without departing from the spirit and scope of these embodiments.

The invention claimed is:

1. A system, comprising:
a master device;
a plurality of slave devices connected to the master device in a daisy chain arrangement, the plurality of slave devices including a first slave device having a first memory and a second slave device having a second memory;
wherein the master device and the plurality of slave devices are configured to communicate according to a serial peripheral device interface (SPI) protocol;
wherein the master device includes circuitry to:
clock a series of bits into respective shift registers of the plurality of slave devices, including (a) first data clocked into first shift registers of the first slave device and (b) an ignore command clocked into second shift registers of the second slave device; and
use a clock signal to communicate an execute instruction to the plurality of slave devices;
wherein the execute instruction causes the first slave device to write the first data from the first shift registers to the first memory of the first slave device; and
wherein the execute instruction causes the second slave device to execute the ignore command to preclude a data write at the second memory of the second slave device.

2. The system of claim 1, wherein the ignore command causes the second slave device to enter a no operation mode (NOP) in response to the execute instruction.

3. The system of claim 1, wherein the ignore command comprises a reserved address for the second slave device that is executable by the second slave device as a no operation mode (NOP) command.

4. The system of claim 1, wherein using a clock signal to communicate an execute instruction to the plurality of slave devices comprises raising a clock signal (CS) high.

5. A method, comprising:
operating a network including a master device and a plurality of slave devices connected to the master device in a daisy chain arrangement, the plurality of slave devices including a first slave device having a first memory and a second slave device having a second memory;
wherein the master device and the plurality of slave devices are configured to communicate according to a serial peripheral device interface (SPI) protocol;
clocking, by the master device, a series of bits into respective shift registers of the plurality of slave devices, including (a) first data clocked into first shift registers of the first slave device and (b) an ignore command clocked into second shift registers of the second slave device; and
controlling a clock signal, by the master device, to communicate an execute instruction to the plurality of slave devices;
wherein the execute instruction causes the first slave device to write the first data from the first shift registers to the first memory of the first slave device; and
wherein the execute instruction causes the second slave device to execute the ignore command to preclude a data write at the second memory of the second slave device.

6. The method of claim 5, wherein the ignore command causes the second slave device to enter a no operation mode (NOP) in response to the execute instruction.

7. The method of claim 5, wherein the ignore command comprises a reserved address for the second slave device that is executable by the second slave device as a no operation mode (NOP) command.

8. A system, comprising:
a master device configured to communicate data with at least one slave device according to a serial peripheral device interface (SPI) protocol;
a serial data in (SDI) line connected between the master device and a first slave device of the at least one slave device;
a serial clock signal (SCK) line connected between the master device and each of the at least one slave device;
wherein the master device includes circuitry to initiate a slave reset procedure including:
sending a predefined number of clock signals over the SCK line to each of the at least one slave device; and
maintaining the SDI line at a predefined level for the duration of the predefined number of clock signals;
wherein receipt of the predefined number of clock signals with the SDI line maintained at the predefined level causes each respective slave device to automatically perform an internal reset.

9. The system of claim 8, wherein:
the at least one slave device comprises a plurality of slave devices connected to the master device in a daisy chain arrangement;

the SCK line is connected between the master device and each of the plurality of slave devices;

the master device includes circuitry to send the predefined number of clock signals over the SCK line to each of the plurality of slave devices; and each of the plurality of slave devices includes circuitry to automatically perform an internal reset of the respective slave device in response to receiving the predefined number of clock signals with the SDI line maintained at the predefined level.

10. The system of claim 9, comprising a chip select (CS) line connected between the master device and the first slave device;

wherein the master device includes circuitry to maintain the CS line at a predefined level for the duration of the predefined number of clock signals.

11. The system of claim 9, wherein the master device includes circuitry to:

receive a reset confirmation signal from via a serial data out (SDO) line connected between the last slave device and the master device;

compare a timing of the receipt of the reset confirmation signal with an expected timing of receipt of the reset confirmation signal; and determine a system status based on the comparison.

12. The system of claim 11, wherein the expected timing of receipt of the reset confirmation signal corresponds with the predefined number of clock signals.

13. The system of claim 11, wherein the master device includes circuitry to:

in response to determining, based on the comparison, the timing of the receipt of the reset confirmation signal matches the expected timing of receipt of the reset confirmation signal, initiate a restart of normal operation of the system; and in response to determining, based on the comparison, the timing of the receipt of the reset confirmation signal does not match the expected timing of receipt of the reset confirmation signal, re-initiate the slave reset procedure.

14. The system of claim 8, wherein the at least one slave device are connected to the master device in parallel configuration or other non-daisy chain configuration.

15. A method, comprising:

communicating data from a master device to at least one slave device according to a serial peripheral device interface (SPI) protocol;

wherein a serial data in (SDI) line connected between the master device and a first slave device of the at least one slave device; and wherein a serial clock signal (SCK) line connected between the master device and each of the at least one slave device;

initiating, by the master device, a slave reset procedure including:

sending a predefined number of clock signals over the SCK line to each of the at least one slave device; and maintaining the SDI line at a predefined level for the duration of the predefined number of clock signals;

wherein receipt of the predefined number of clock signals with the SDI line maintained at the predefined level causes each respective slave device to automatically perform an internal reset.

16. The method of claim 15, wherein the at least one slave device comprises a plurality of slave devices connected to the master device in a daisy chain arrangement.

17. The method of claim 16, comprising, maintaining, by the master device, a chip select (CS) line, connected between the master device and the first slave device, at a predefined level for the duration of the predefined number of clock signals.

18. The method of claim 15, comprising:

receiving, by the master device, a reset confirmation signal from via a serial data out (SDO) line connected between the last slave device and the master device;

comparing, by the master device, a timing of the receipt of the reset confirmation signal with an expected timing of receipt of the reset confirmation signal; and determining, by the master device, a system status based on the comparison.

19. The method of claim 18, comprising:

in response to determining, based on the comparison, the timing of the receipt of the reset confirmation signal matches the expected timing of receipt of the reset confirmation signal, initiating a restart of normal system operation by the master device; and in response to determining, based on the comparison, the timing of the receipt of the reset confirmation signal does not match the expected timing of receipt of the reset confirmation signal, re-initiating the slave reset procedure by the master device.

20. The method of claim 15, wherein the at least one slave device comprises multiple slave devices connected to the master device in a parallel configuration or other non-daisy chain configuration.

* * * * *